(12) United States Patent
Tazzia et al.

(10) Patent No.: US 8,686,095 B2
(45) Date of Patent: Apr. 1, 2014

(54) PROCESS FOR CONTINUOUS PRODUCTION OF EPOXY RESINS

(75) Inventors: Charles L Tazzia, Grosse Pointe Farms, MI (US); Marco A Villalobos, Canton, MI (US); Paul J Harris, West Bloomfield, MI (US)

(73) Assignee: BASF Corporation, Wyandotte, MI (US)

( * ) Notice: Subject to any disclaimer, the term of this patent is extended or adjusted under 35 U.S.C. 154(b) by 636 days.

(21) Appl. No.: 12/164,764

(22) Filed: Jun. 30, 2008

(65) Prior Publication Data

US 2009/0326173 A1    Dec. 31, 2009

(51) Int. Cl.
C08F 2/00        (2006.01)
B01J 19/18       (2006.01)

(52) U.S. Cl.
USPC ............................. 526/66; 422/134; 526/65

(58) Field of Classification Search
USPC .......................................... 525/423; 422/134
See application file for complete search history.

(56) References Cited

U.S. PATENT DOCUMENTS

| | | | |
|---|---|---|---|
| 3,735,558 A | 5/1973 | Skarstrom et al. | |
| 3,919,169 A | 11/1975 | Jayroe et al. | |
| 4,001,156 A | 1/1977 | Bosso et al. | |
| 4,105,634 A * | 8/1978 | Hanson et al. | 526/65 |
| 4,148,772 A | 4/1979 | Marchetti et al. | |
| 4,186,086 A * | 1/1980 | Ward | 210/683 |
| 4,338,232 A | 7/1982 | Harris et al. | |
| 4,568,735 A | 2/1986 | Li | |
| 5,089,100 A * | 2/1992 | Debroy et al. | 204/505 |
| 5,310,955 A * | 5/1994 | Shirtum et al. | 549/517 |
| 5,372,790 A | 12/1994 | Shirtum et al. | |
| 5,416,137 A | 5/1995 | Turnquist et al. | |

(Continued)

FOREIGN PATENT DOCUMENTS

EP          0496163 A      7/1992
JP          03122112 A     5/1991

(Continued)

OTHER PUBLICATIONS

Chemical Abstracts, Abstract for Falcotet et al., "Study of a continuous process for the production of sold epoxide resins," [Source: Dechema, Monographien (2001), 137 (7th International Workshop on Polymer Reaction Engineering, 2001), 475-480].

(Continued)

Primary Examiner — Peter F Godenschwager
Assistant Examiner — David Karst
(74) Attorney, Agent, or Firm — Quinn Law Group, PLLC

(57) ABSTRACT

An epoxy resin with amine functionality is manufactured continuously through a first reaction zone in which an epoxide-functional resin is made by ring-opening addition, a second reaction zone in which the resin is reacted with amine to make an epoxide-functional product, and a third reaction zone in which the epoxide functional product is reacted with amine to make the epoxy resin with amine functionality. In other embodiments, some amine may be added in the first reaction zone to produce an epoxide functional product, with elimination of the second reaction zone, or all of the amine reactant may be added in the first reaction zone to produce an amine functional product, with elimination of both the second and third reaction zones. Optionally, solvent may be removed in an evaporation zone and recycled into the continuous process and further zones may be included to incorporate crosslinker, additives, and to emulsify the resin.

4 Claims, 6 Drawing Sheets

(56) References Cited

U.S. PATENT DOCUMENTS

| | | | |
|---|---|---|---|
| 5,824,752 | A | 10/1998 | Beerepoot et al. |
| 6,017,432 | A * | 1/2000 | Boyd et al. ............... 204/501 |
| 6,022,931 | A | 2/2000 | Beerepoot et al. |
| 6,204,310 | B1 | 3/2001 | Choudhery |
| 6,245,835 | B1 | 6/2001 | Klein et al. |
| 6,262,189 | B1 | 7/2001 | Beerepoot et al. |
| 6,436,326 | B1 | 8/2002 | Keillor |
| 6,492,483 | B1 * | 12/2002 | Li et al. ............... 528/89 |
| 6,512,024 | B1 | 1/2003 | Lundgard et al. |
| 6,512,025 | B2 | 1/2003 | Choudhrey |
| 6,552,144 | B1 | 4/2003 | Campbell et al. |
| 6,605,681 | B1 * | 8/2003 | Villalobos et al. ........ 526/319 |
| 6,653,369 | B2 | 11/2003 | Gerlitz et al. |
| 6,812,269 | B2 | 11/2004 | Koenraadt et al. |
| 7,387,718 | B2 | 6/2008 | Cheong |
| 2002/0038160 | A1 | 3/2002 | Franca et al. |
| 2006/0280949 | A1 * | 12/2006 | Shirakawa et al. ........ 428/418 |
| 2007/0270526 | A1 | 11/2007 | Tazzia |
| 2008/0272005 | A1 | 11/2008 | Tazzia |

FOREIGN PATENT DOCUMENTS

| | | |
|---|---|---|
| JP | 4335019 | 11/1992 |
| JP | 05098032 | 4/1993 |
| JP | 1066227 | 12/1995 |
| WO | WO92/02588 A | 2/1992 |
| WO | WO 01/16204 A1 | 3/2001 |

OTHER PUBLICATIONS

Chemical Abstracts, Abstract for Ivanov et al., "Preparation of low-molecular-weight dian epoxy resins by a continuous method," [Source: Plasticheskie Massy (1990), (3), 15-18].

Chemical Abstracts, Abstract for Kapitonov et al., "Continuous distillation of solvents from solutions of epoxy-bisphenol A resins," [Source: Plasticheskie Massy (1982), (11), 18-19].

Chemical Abstracts, Abstract for Brojer, Z., "Bisphenol-A Epoxide Resins: Achievements in Investigatory and Manufacturing Methods," [Source: Polimery Tworzywa Wielkoczasteczkowe 25, Nos. 6/7, Jun./Jul. 1980, pp. 205-9].

* cited by examiner

PROCESS FOR CONTINUOUS PRODUCTION OF EPOXY RESINS

FIELD OF THE DISCLOSURE

The invention relates methods of making amine functional resins from polyepoxides, particularly epoxy resins for electrodeposition coating compositions.

BACKGROUND OF THE DISCLOSURE

The statements in this section merely provide background information related to this disclosure and may not constitute prior art.

Electrodeposition coating ("electrocoat") compositions and methods are widely used in industry today. Electrocoat baths usually comprise an aqueous dispersion or emulsion including a principal film-forming epoxy resin ("polymer" and "resin" are used interchangeably in this disclosure), having ionic stabilization in water or a mixture of water and organic cosolvent. In automotive or industrial applications for which durable electrocoat films are desired, the electrocoat compositions are formulated to be curable (thermosetting) compositions. This is usually accomplished by emulsifying with the principal film-forming resin a crosslinking agent that can react with functional groups on the principal resin under appropriate conditions, such as with the application of heat, and so cure the coating. During electrodeposition, coating material containing the ionically-charged resin having a relatively low molecular weight is deposited onto a conductive substrate by submerging the substrate in the electrocoat bath and then applying an electrical potential between the substrate and a pole of opposite charge, for example, a stainless steel electrode. The charged coating material migrates to and deposits on the conductive substrate. The coated substrate is then heated to cure or crosslink the coating.

In a cathodic electrocoating process, the article to be coated is the cathode. Water-dispersible resins used in the cathodic electrodeposition coating process have amine functional group such as primary, secondary, tertiary, and/or quaternary amine moiety as a positively chargeable hydrophilic group. Such resins are presently made by batch processes that include a number of steps, which may require cooling before some steps. Continuous processes for manufacturing vinyl polymers are disclosed in Campbell et al., U.S. Pat. No. 6,552,144, Villalobos et al., U.S. Pat. No. 6,605,681, and the documents described in the background sections of these patents. These processes concern free radical, chain reaction polymerizations, however, and do not concern step-wise polymerizations such as those by which amine-functional epoxy resins are prepared.

SUMMARY OF THE DISCLOSURE

The present disclosure describes a method and apparatus for continuous manufacture of an epoxy resin with amine functionality.

In one embodiment of the method, an epoxy resin with amine functionality is continuously manufactured by: (a) introducing a polyepoxide, a chain extender (reactant with at least two active hydrogen-containing groups, also referred to as "extender"), and, optionally, one or more monofunctional (chain-stopper) reactants and/or polyfunctional reactants with three or more reactive groups along with catalyst into a first reaction zone where ring-opening polymerization (or chain extension) takes place during an average residence time of not more than about sixty minutes and removing epoxide-functional epoxy resin from the first reaction zone at the same rate as the reactants and catalyst are introduced; (b) feeding into a second reaction zone the epoxy resin and an amine containing an active hydrogen or mixtures of such amines at the same rate as epoxy resin is removed from the first reaction zone, with a ring-opening addition of amine to epoxide groups occurring in the second reaction zone, with the epoxy resin and amine reactants having an average residence time of not more than about sixty minutes in the second reaction zone, and removing epoxide-functional product from the second reaction zone at the same rate as epoxy resin and amine reactants are introduced into the second reaction zone; (c) feeding the epoxide-functional product of the second reaction zone and an amine containing all active hydrogen or mixtures of such amines as reactants into a third reaction zone at the same rate at which the epoxide-functional product is removed from the second reaction zone, wherein the reactants have an average residence time in the third reaction zone of not more than about sixty minutes, with a ring-opening addition of amine to epoxide groups occurring in the third reaction zone to produce an epoxy resin with amine functionality, which is removed from the third reaction zone at the same rate as the reactants are fed into the third reaction zone; and (d) optionally, introducing the epoxy resin with amine functionality from the third reaction zone into an evaporation zone where a desired amount of any solvent, residual reactants, and/or by-products present in the product are removed, wherein the epoxy resin with amine functionality is introduced into and removed from the evaporation zone at the same rate as epoxy resin with amine functionality is removed from the third reaction zone. Any solvent or residual reactant recovered from the evaporation zone may optionally be recycled back into the process at an appropriate point.

In a similar embodiment, step (a) is carried out without adding catalyst. The temperature of the first reaction zone is sufficiently high so that the reaction of polyepoxide, extender, and any optional co-reactants proceeds without a catalyst.

In another embodiment of the method, an epoxy resin with amine functionality is continuously manufactured by: (a) introducing polyepoxide, chain extender, an amine containing active hydrogen or a mixture of such amines, and, optionally, one or more monofunctional reactants and/or polyfunctional reactants with three or more reactive groups along with catalyst into a first reaction zone where ring-opening polymerization takes place during an average residence time of not more than about sixty minutes and removing an epoxide-functional resin product from the first reaction zone at the same rate as the reactants are introduced; (b) feeding the epoxide-functional product of the first reaction zone at the same rate at which the epoxide-functional product is removed from the first reaction zone and an amine containing an active hydrogen or a mixture of such amines as reactants into a second reaction zone, wherein the reactants have an average residence time in the second reaction zone of not more than about sixty minutes, to produce an epoxy resin with amine functionality, which is removed from the second reaction zone at the same rate as the reactants are fed into the second reaction zone; and (c) optionally, introducing the epoxy resin with amine functionality from the second reaction zone into an evaporation zone where a desired amount of any solvent, residual reactants, and/or by-products present in the product is removed, wherein the epoxy resin with amine functionality is introduced into and removed from the evaporation zone at the same rate as epoxy resin with amine functionality is removed from the second reaction zone. Any solvent or residual reactant recovered from the evaporation zone may optionally be recycled back into the process at an appropriate point. In one example of this embodiment, an amine sufficiently basic to catalyze the ring-opening polymerization, which may also be a reactant, is included as catalyst in the reactants of step (a). In a similar embodiment, step (a) is carried out without adding catalyst but with a temperature of the first reaction zone sufficiently high so that the reaction of polyepoxide, extender, amine, and any optional co-reactants proceeds without a catalyst.

In another embodiment of the method, an epoxy resin with amine functionality is continuously manufactured by: (a) introducing polyepoxide, chain extender, an amine containing active hydrogen or a mixture of such amines, and, optionally, one or more monofunctional reactants and/or polyfunctional reactants with three or more reactive groups into a reaction zone where reaction takes place during an average residence time of not more than about sixty minutes to produce an epoxy resin with amine functionality, which is removed from the reaction zone at the same rate as the reactants are fed into the reaction zone; and (b) optionally, introducing the epoxy resin with amine functionality from the second reaction zone into an evaporation zone where a desired amount of any solvent present in the product is removed and any residual reactants may be removed, wherein the epoxy resin with amine functionality is introduced into and removed from the evaporation zone at the same rate as epoxy resin with amine functionality is removed from the third reaction zone. Any solvent or reactant recovered from the evaporation zone may optionally be recycled back into the process at an appropriate point. In one example of this embodiment, an amine sufficiently basic to catalyze the ring-opening polymerization is included in the reactants of step (a). In another example, a different catalyst is employed for the reaction in step (a). In a similar embodiment, step (a) is carried out without adding catalyst but with a temperature of the first reaction zone sufficiently high so that the reaction of polyepoxide, extender, amine, and any optional co-reactants proceeds without a catalyst.

In various embodiments, the process includes further steps in which other materials are mixed with the epoxy resin with amine functionality and the mixture is dispersed in an aqueous medium. In one example, continuous manufacture is continued by passing the epoxy resin having amine functionality at a point after the last reaction zone (e.g., after an evaporation zone) through one or more mixing zones and/or mixing and cooling zones where other materials selected from solvents, plasticizers, crosslinkers, additives, and aqueous media (e.g., DI water containing one or more acids for salting the resin and optionally water-miscible or water-soluble organic cosolvent) are incorporated. In another example, continuous manufacture is continued by passing the epoxy resin having amine functionality at a point after the last reaction zone (e.g., after an evaporation zone) through one or more mixing zones and/or mixing and cooling zones where other materials selected from solvents, plasticizers, crosslinkers, and additives are incorporated and the resulting mixture is then introduced into one of a plurality of vessels containing aqueous media (e.g., DI water containing one or more acids for salting the resin and optionally water-miscible or water-soluble organic cosolvent) to prepare a dispersion.

An apparatus for carrying out the processes includes a metered source or metered sources of polyepoxide reactant, extender reactant, optionally monofunctional reactants, and (optionally) catalyst upstream of and in fluid communication with a first reaction zone, a second reaction zone downstream of and in fluid communication with the first reaction zone to receive a first product, a metered source of amine containing an active hydrogen upstream of the second reaction zone and in communication with the second reaction zone, a third reaction zone downstream of and in fluid communication with the second reaction zone to receive a second product, and a metered source of a amine containing an active hydrogen upstream of the third reaction zone and in communication with the third reaction zone. In certain embodiments, the apparatus may include an evaporation zone in fluid communication with and downstream of the third reaction zone. Solvent, residual reactants, or both that may be recovered in the evaporation zone may be recycled into an appropriate metered source of the apparatus.

Another embodiment of an apparatus for carrying out the processes includes a metered source or metered sources of polyepoxide reactant, extender reactant, amine containing an active hydrogen, optionally monofunctional reactants, and (optionally) catalyst upstream of and in fluid communication with a first reaction zone and a second reaction zone downstream of and in fluid communication with the first reaction zone to receive a first product with a metered source of amine containing an active hydrogen upstream of the second reaction zone and in fluid communication with the second reaction zone. In certain embodiments, the apparatus may include an evaporation zone in fluid communication with and downstream of the second reaction zone. Solvent, residual reactants, or both that may be recovered in the evaporation zone may be recycled into an appropriate metered source of the apparatus.

Another embodiment of an apparatus for carrying out the processes includes a metered source or metered sources of polyepoxide reactant, extender reactant, amine containing an active hydrogen, optionally monofunctional and/or polyfunctional reactants, and (optionally) catalyst upstream of and in fluid communication with a reaction zone. In certain embodiments, the apparatus may include an evaporation zone in fluid communication with and downstream of the reaction zone. Solvent, residual reactants, or both that may be recovered in the evaporation zone may be recycled into an appropriate metered source of the apparatus.

In various embodiments, the apparatus may include further mixing zones with related metered sources of further materials, such as solvents, plasticizers, crosslinkers, additives, and aqueous media, or the apparatus may include further mixing zones with related metered sources of further materials, such as solvents, plasticizers, crosslinkers, and additives, and, optionally, a plurality of vessels for dispersing the epoxy resin having amine functionality in an aqueous medium.

"A" and "an" as used herein indicate "at least one" of the item is present; a plurality of such items may be present, when possible. Other than in the working examples provides at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and subdivided ranges within the entire range.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The invention will be described with reference to the accompanying drawings, wherein like numbers reference like elements.

DETAILED DESCRIPTION

The following description is merely exemplary in nature and is not intended to limit the present disclosure, application, or uses.

Figure 1:
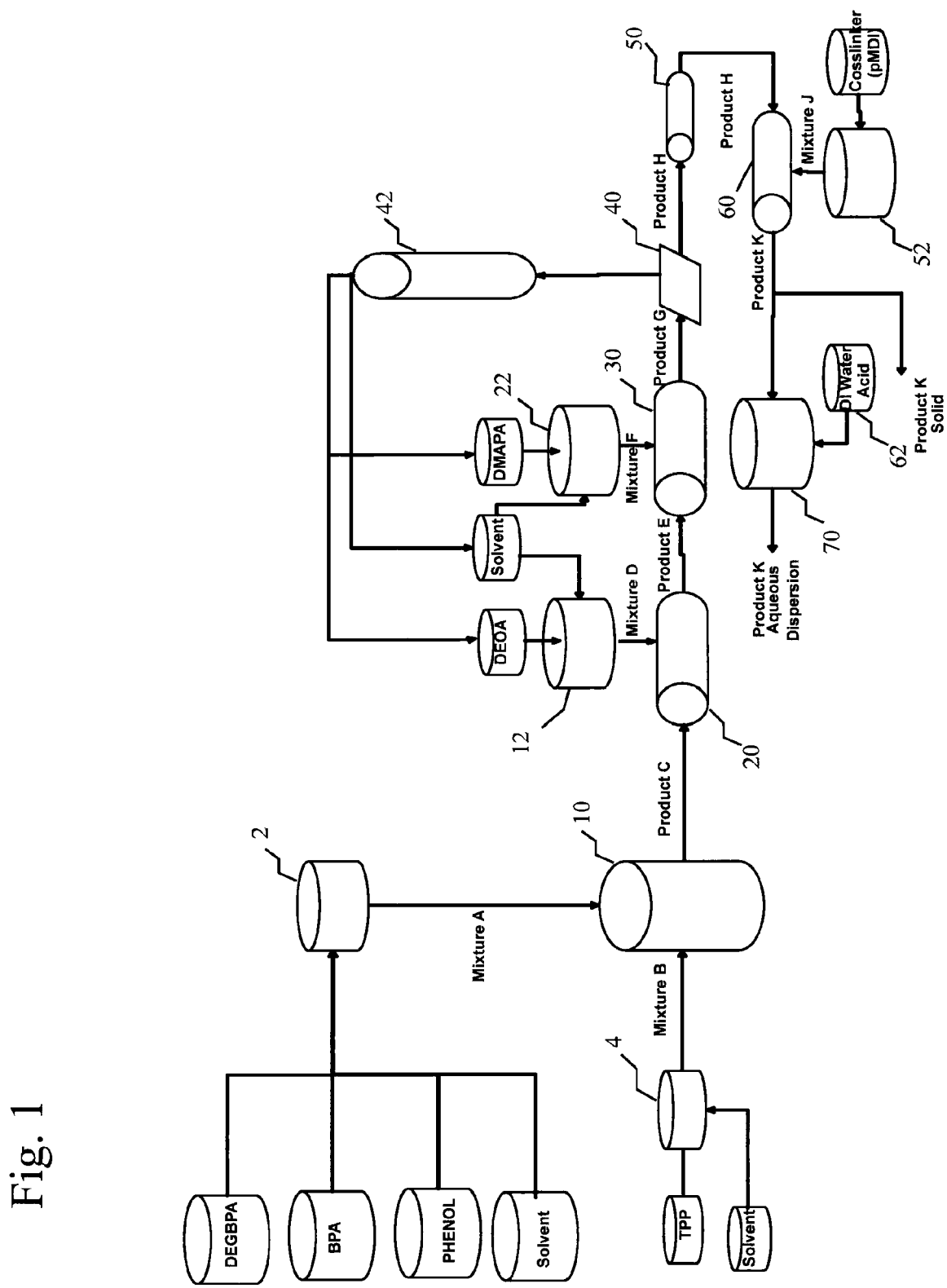
FIG. 1 is a block diagram showing an example of an apparatus with three reaction zones for continuous manufacture of epoxy resins having amine functionality.

FIG. 1 illustrates one embodiment of an apparatus for carrying out the disclosed method. While FIG. 1 includes abbreviations and indications of various particular reactants, it should be understood that the methods and apparatuses are not limited to these particular reactants. With reference now to FIG. 1, the reaction apparatus includes at least two metering talks 2, 4 that serve as sources for continuously feeding reactants and catalyst for the epoxy polymerization reaction. An epoxide-functional prepolymer Product C is the reaction product of an excess of a polyepoxide reacted with an extender and optionally a monofunctional reactant. The polyepoxide may be monomeric or oligomeric. One example of a polyepoxide, as shown in FIG. 1, is a diglycidyl ether of bisphenol A (DGEBA) or a resin derived from the diglycidyl ether of bisphenol, and one example of an extender is a diphenol reactant, such as bisphenol A (BPA), as shown in FIG. 1. Examples of monofunctional reactants that may also be included are phenol (as shown in FIG. 1) or the glycidyl ether of phenol. FIG. 1 illustrates an embodiment in which a catalyst is used. The reactants and catalyst are divided between metering tanks 2, 4 in a way to prevent reaction until the contents of metering tanks 2, 4 are fed into reactor 10. The division of materials between metering tanks 2,4 can be done in different ways. In one embodiment, the one shown in FIG. 1, the reactant monomers (polyepoxide, extender, and monofunctional reactant) are loaded to tank 2 and a catalyst (exemplified as "TPP" in FIG. 1) is loaded to tank 4. For ease of metering, the catalyst is in this case diluted with solvent. In certain embodiments, an amine sufficiently basic to catalyze the ring-opening polymerization is included in the reactants. In certain embodiments, it may be desirable to include solvent along with the polyepoxide, extender, or other reactants, as is shown in FIG. 1, particularly in the case of highly viscous mixtures. In another embodiment, the epoxide-functional reactants and the active hydrogen-functional reactants are loaded to separate metering tanks, for example with the epoxide-functional reactants loaded to tank 2 and the active hydrogen-functional reactants loaded to tank 4. In this embodiment, catalyst may be included in either or both tanks or in a still further metering tank. Again, solvent may be included for ease of metering or viscosity control.

There may, of course, be more metering tanks, with a further division of reactants among them. For simplicity, however, it is better to keep the number of metering tanks to a minimum. The metering tanks may include stirring equipment to provide a well-mixed feed of materials to the reaction zone, including agitators, static mixing elements, kneading elements, and the like. The metering tanks may also be capable of being heated; the contents of a metering tank may be heated to reduce viscosity. A pump or pressure may be used to feed material from the metering tank into a reaction zone, or the metering tank may feed by gravity into the reaction zone.

In FIG. 1, the contents of metering tanks 2,4 are fed into a first reaction zone 10. Examples of equipment suitable for providing reaction zones for the disclosed continuous flow reactions include, but are not limited to, continuous stirred tank reactors ("CSTRs"), tube reactors, tapered reactors, Taylor reactors, other types of plug flow reactors, loop reactors, extruder reactors, and combinations of these. These reactors may be configured horizontally, vertically, or at angles. The reaction zone should have provision for close control of temperatures in the reaction zone, such as control by a cooling jacket and heating jacket, internal heating coils, internal cooling coils, internal heating or cooling mixing elements, external heating or cooling elements such as extended fins, other temperature control equipment, or combinations of these. The reaction zone may also include stirring equipment to provide a well-mixed reaction zone, including agitators, static mixing elements, augers, single and twin screws, rotating paddles, rotating drums, rotor-stator arrays, and the like. The reaction zones can be operated with or without a headspace. If the reaction zones have no headspace, but are instead liquid full, productivity is increased and fouling of the equipment in the headspace is avoided. "Liquid full" is used to mean that all of the usable volume is filled with liquid so that the reaction zone vessel is operated without a headspace.

Suitable polyepoxide reactants include, without limitation, diglycidyl aromatic compounds such as the diglycidyl ethers of polyhydric phenols such as 2,2-bis(4-hydroxyphenyl)propane (bisphenol A), 2,2-bis(4-hydroxy-3-methylphenyl)propane, 4,4'-dihydroxybenzophenone, dihydroxyacetophenones, 1,1-bis(4hydroxyphenylene)ethane, bis(4-hydroxyphenyl) methane, 1,1-bis(4hydroxyphenyl) isobutane, 2,2-bis(4-hydroxy-tert-butylphenyl) propane, 1,4-bis(2-hydroxyethyl)piperazine, 2-methyl-1,1-bis(4-hydroxyphenyl)propane, bis-(2-hydroxynaphthyl)methane, 1,5-dihydroxy-3-naphthalene, and other dihydroxynaphthalenes, catechol, resorcinol, and the like. Also suitable are the diglycidyl ethers of aliphatic diols, including the diglycidyl ethers of 1,4-butanediol, cyclohexanedimethanols, ethylene glycol, propylene glycol, diethylene glycol, dipropylene glycol, triethylene glycol, tripropylene glycol, polypropylene glycol, polyethylene glycol, poly(tetrahydrofuran), 1,3-propanediol, 2,2,4-trimethyl-1,3-pentanediol, 1,6-hexanediol, 2,2-bis(4-hydroxycyclohexyl) propane, and the like. Diglycidyl esters of dicarboxylic acids can also be used as polyepoxides. Specific examples of compounds include the diglycidyl esters of oxalic acid, cyclohexanediacetic acids, cylcohexanedicarboxylic acids, succinic acid, glutaric acid, phthalic acid, terephthalic acid, isophthalic acid, naphthalene dicarboxylic acids, and the like. A polyglycidyl reactant may be used, preferably in a minor amount in combination with diepoxide reactant. Novolac epoxies may be used as a polyepoxide-functional reactant. The novolac epoxy resin may be selected from epoxy phenol novolac resins or epoxy cresol novolac resins. Other suitable higher-functionality polyepoxides are glycidyl ethers and esters of triols and higher polyols such as the triglycidyl ethers of trimethylolpropane, trimethylolethane, 2,6-bis(hydroxymethyl)-p-cresol, and glycerol; tricarboxylic acids or polycarboxylic acids. Also useful as polyepoxides are epoxidized alkenes such as cyclohexene oxides and epoxidized fatty acids and fatty acid derivatives such as epoxidized soybean oil. Other useful polyepoxides include, without limitation, polyepoxide polymers such as acrylic, polyester, polyether, and epoxy resins and polymers, and epoxy-modified polybutadiene, polyisoprene, acrylobutadiene nitrile copolymer, or other epoxy-modified rubber-based polymers that have a plurality of epoxide groups. In the example shown in FIG. 1, the polyepoxide reactant is the diglycidyl ether of bisphenol A (DGEBA) and/or oligomers of DGBPA. For example, the diglycidyl ether of bisphenol A may have an epoxide equivalent weight (EEW) of from about 175 to about 225 g/eq.

Suitable extenders have at least two active hydrogen-containing groups and include polycarboxylic acids, polyols, polyphenols, and amines having two or more amino hydrogens, especially dicarboxylic acids, diols, diphenols, and diamines. Particular, nonlimiting examples of suitable extenders include diphenols, diols, and diacids such as those mentioned above in connection with forming the polyepoxide; polycaprolactone diols, and ethoxylated bisphenol A resins such as those available from BASF Corporation under the trademark MACOL®. Other suitable extenders include, without limitation, carboxy- or amine-functional acrylic, polyester, polyether, and epoxy resins and polymers. Still other suitable extenders include, without limitation, polyamines, including diamines such as ethylenediamine, diethylenetriamine, triethylenetetramine, dimethylaminopropylamine, dimethylaminobutylamine, diethylaminopropylamine, diethylaminobutylamine, dipropylamine, and piperizines such as 1-(2-aminoethyl)piperazine, polyalkylenepolyamines such as triethylenetetramine, tetraethylenepentamine, pentaethylenehexamine, tripropylenetetramine, tetrapropylenepentamine, pentapropylenehexamine, N,N'-bis(3-aminopropyl)ethylenediamine, N-(2-hydroxyethyl) propane-1,3-diamine, and polyoxyalkylene amines such as those available from BASF AG under the trademark POLYAMIN® or from Huntsman under the trademark JEFFAMINE®. FIG. 1 shows bisphenol A (BPA) as the extender reactant.

Monofunctional reactants that may optionally be included are, without limitation, phenol, alkylphenols such as nonylphenol and dodecylphenol, other monofunctional, epoxide-reactive compounds such as dimethylethanolamine and monoepoxides such as the glycidyl ether of phenol, the glycidyl ether of nonylphenol, or the glycidyl ether of cresol, and dimer fatty acid. FIG. 1 shows phenol as a monofunctional reactant.

Useful catalysts include any that activate an oxirane ring, such as tertiary amines or quaternary ammonium salts (e.g., benzyldimethylamine, dimethylaminocyclohexane, triethylamine, N-methylimidazole, tetramethyl ammonium bromide, and tetrabutyl ammonium hydroxide.), tin and/or phosphorous complex salts (e.g., $(CH_3)_3$ SNI, $(CH_3)_4$ PI, triphenylphosphine, ethyltriphenyl phosphonium iodide, tetrabutyl phosphonium iodide) and so on. It is known in the art that tertiary amine catalysts may be preferred with some reactants. FIG. 1 shows triphenylphosphine (TPP) as a catalyst.

Suitable solvents include, without limitation, inert organic solvent such as a ketone, including methyl isobutyl ketone and methyl amyl ketone, aromatic solvents such as toluene, xylene, Aromatic 100, and Aromatic 150, and esters, such as butyl acetate, n-propyl acetate, hexyl acetate.

With reference again to the particular example shown in FIG. 1, a liquid mixture (A) comprising about 50 to about 90% by weight of the diglycidyl ether of bisphenol A (DGEBPA), EEW=175 to 225 g/eq, about 10 to about 30% by weight of bisphenol A (BPA), 0 to about 20% by weight phenol or a phenol derivative (such as an alkylphenol, etc) (designated "PHENOL" in FIG. 1), and, optionally, 0 to about 20% by weight of a suitable solvent (such as xylene) is held in a metering tank 2 at from about 50° C. to about 135° C., from where it is continuously added to a first reaction zone 10 operating at a temperature of from about 100° C. to about 350° C. (in other embodiments 160° C. to 250° C.). The particular epoxy equivalent weights, percentages of reactants, and reaction temperatures are adjusted depending on the particular reactants selected and the desired product. To prepare an epoxide-functional reaction product, the equivalents of polyepoxide and any monofunctional epoxide reactants are kept in slight to moderate excess (e.g. 5 to 50% equivalent excess) relative to the equivalents of chain extender and any monofunctional reactant reactive with epoxide. Metering tank 2 serves as the source for these materials, and is replenished at intervals to allow for the continual addition of the materials to first reaction zone 10. A liquid mixture (B) of about 10 to about 90 weight % of a suitable catalyst such as triphenylphosphine (TPP) and about 90 to about 10 weight % of a suitable solvent (such as xylene), is held in metering tank 4 at from about 50° C. to about 125° C., from where it is continuously added to the first reaction zone 10. The feed rates of liquid mixture (A) and liquid mixture (B) from metering tanks 2, 4 are adjusted with respect to one another so that the concentration of catalyst (e.g., TPP) in the total feed of reactants into the first reaction zone 10 is maintained at from about 0.001 to about 1.0% by weight. The total feed rate from metering tanks 2, 4 is also controlled so that the average residence time of material in the first reaction zone 10 is less than about 60 minutes. In other embodiments, the residence time of materials in first reaction zone 10 may be less than about 30 minutes or less than about 15 minutes. The conditions (temperature, average residence time) are adjusted when the continuous manufacturing process is commenced to produce the desired epoxide-functional product.

A reaction product (C) of the first reaction zone, an epoxide-functional resin having an epoxide equivalent weight EEW for example of about 400 to about 600 g/eq., is continuously removed from the first reaction zone 10 at the same mass rate as the combined mass feed rate of mixtures (A) and (B) into first reaction zone 10. Reaction product (C) is continuously fed at the same mass rate at which is removed from reaction zone 10 to a second reaction zone 20 operating at a temperature of from about 120° C. to about 300° C. In various other embodiments the reaction product (C) may have an EEW of from about 450 to about 575 or from about 500 to about 550. A liquid mixture (D) comprising from about 50 to about 100% of an amine containing an active hydrogen or mixture of such amines (in FIG. 1, represented by DEOA, diethanolamine) and 0 to about 50% of a suitable solvent is held in a metering tank 12 at from about 50° C. to about 125° C., from where liquid mixture (D) is continuously fed to the second reaction zone 20.

Other suitable examples of amines that could be used in liquid mixture (D) include, without limitation, alkanolamines such as dipropanolamine, diisopropanolamine, dibutanolamine, diisobutanolamine, diglycolamine, methylethanolamine, dimethylaminopropylamine, the amines mentioned below in connection with liquid mixture (F), and so on. Suitable example of solvents include those mentioned above with regard to metering tanks 2,4.

The feed rate of liquid mixture (D) is adjusted so that the concentration of the amine is controlled to be from about 1 to about 30% by weight of product (C), depending on the amine equivalent weight and amount of solvent in liquid mixture (D) and product (C), to produce an epoxide-functional reaction product. The reaction volume of the second reaction zone 20 is controlled so that the average residence time in reaction zone 20 is not more than about 60 minutes. In various embodiments, the average residence time in reaction zone may be not more than about 30 minutes or not more than about 15 minutes. Metering tank 12 is replenished at intervals to ensure the continuous fee rate of liquid mixture (D).

The reaction product (E) of the second reaction zone 20 may have an epoxide equivalent weight EEW of from about 450 to about 1000 g/eq. In various embodiments, the reaction product (E) has an EEW of from about 500 to about 850 g/eq or from about 600 to about 700 g/eq. The reaction product (E) may also have a hydroxyl equivalent weight HEW of from about 275 to about 525 g/eq. In various embodiments, the reaction product (E) has an HEW of from about 325 to about 475 g/eq, or from about 375 to about 425 g/eq. Reaction product (E) is continuously removed from the second reaction zone 20 at the same mass feed rate of the combined liquid mixture (D) and product (C) into reaction zone 20, and reaction product (E) is continuously fed at the same rate to a third reaction zone 30 operating at a temperature of from about 160° C. to about 300° C. A liquid mixture (F) comprising from about 50 to 100% by weight of an amine containing an active hydrogen or mixtures of such amines and from 0 to about 50% by weight of a suitable solvent is held in a metering tank 22 at about 50° C. to about 125° C., from where it is continuously fed to the third reaction zone 30. The feed rate of liquid mixture (F) is adjusted so that the concentration of the amine is controlled to be from about 1 to about 10% by weight of Product (E) depending on the particular amine and amount of solvent in liquid mixture (F) and Product (E). The reaction volume of the third reaction zone 30 is controlled so that the average residence time in reaction zone 30 is no more than about 60 minutes, In various embodiments, the average residence time in reaction zone 30 is no more than about 30 minutes or no more than about 15 minutes. Again, these particular equivalent weights, temperatures, percentages, and other parameters apply to the specific reactants shown in the example of FIG. 1.

Suitable examples of amines containing an active hydrogen that may be used in liquid mixture (F) (or, as mentioned above, in mixture (D)) include, without limitation, dimethylaminiopropylamine, N,N-diethylaminopropylamine, dimethylaminoethylamine, N-aminoethylpiperazine, aminopropylmorpholine, tetramethyldipropylenetriamine, methylamine, ethylamine, dimethylamine, dibutylamine, ethylenediamine, diethylenetriamine, triethylenetetramine, dimethylaminobutylamine, diethylaminopropylamine, diethylaminiobutylamine, dipropylamine, methylbutylamine, alkanolamines such as methylethanolamine, aminoethylethanolamine, aminopropylmonomethylethanolamine, and diethanolamine, diketimine (a reaction product of 1 mole diethylenetriamine and 2 moles methyl isobutyl ketone), and polyoxyalkylene amines. FIG. 1 shows as an example metering tank 22 being charged with dimethylaminopropylamine, DMAPA. Suitable solvents include, without limitation, all of those mentioned above with regard to metering tanks 2,4.

The reaction product (G) of reaction zone 30 may have a hydroxyl equivalent weight HEW of from about 125 to about 500 g/eq. In various other examples, the reaction product (G) has a hydroxyl equivalent weight HEW of from about 175 to about 325 g/eq, or of from about 225 to about 275 g/eq. Reaction product (G) is continuously removed from the third reaction zone 30 at the same mass feed rate as the combined mass feed rated of liquid mixture (F) and product (E). Again, these particular equivalent weights, apply to the specific reactants shown in the example of FIG. 1.

Optionally, the process includes a step of evaporating solvent and/or unreacted material and/or by-product from product (G). In this embodiment, shown in FIG. 1, product (G) is continuously fed at the same rate at which it is removed from reaction zone 30 to an evaporation zone 40 operating at a temperature of from about 160° C. to about 300° C., wherein solvent, any unreacted material (e.g., one of the amines or phenol) or low boiling point by-products are separated from product (G) and, optionally, recycled to an appropriate metering tank. All or only a part of solvent, any unreacted material, or any by-product may be removed in the evaporation zone. In one embodiment, all volatile material is removed in the evaporation zone. In the particular example of FIG. 1, principally solvent and possibly a small amount of amine is separated from product (G). Nonlimiting examples of suitable equipment for the evaporation zone include thin film evaporators, falling strand evaporators, short path evaporators, wiped film evaporators, falling film evaporators, flash tanks, multi-stage evaporators, condensers, and pumps for returning the condensed liquid or liquids to an appropriate feed tank. Optionally, the equipment may include a separation zone that allows separation by distillation.

FIG. 1 shows evaporation zone producing product (H) and being in communication with recuperation unit 42 (e.g., condenser and pump) to return recovered material to an appropriate metering tank or tanks. (If the optional step of evaporating and optional evaporation zone 40 are omitted, product (H) is unchanged from product (G).) FIG. 1, for example, shows return of material from recuperation unit 42 to DEOA, DMAPA, and solvent sources and from there to metering tanks 12, 22. In other embodiments, material may be returned to metering tank 2 or metering tank 4, or to a source that feeds into metering tank 2 or metering tank 4. The product (H) leaving the evaporation zone 40 is continuously removed at the same rate as product (G) enters the evaporation zone, and product (H) is continuously fed to a cooling zone 50 at the same rate. In cooling zone 50, the temperature of product (H) is lowered, for example from the temperature at which product (H) leaves reaction zone 30 to a temperature from about 180° C. to about 50° C. Product (H) may be removed from the cooling zone and processed in separate processes, or product (H) may be processed in further, optional steps of the continuous process, as shown in FIG. 1 to produce an electrocoat emulsion.

Continuing, product (H), now cooled down to about 180° C. to about 50° C., is fed continuously to a mixing zone 60 at the same mass feed rate by which it is removed from cooling zone 50. A liquid mixture (J) comprising at least one crosslinking agent is held in a metering tank 52, for example at from about 25° C. to about 100° C., from where it is continuously fed to the mixing zone 60 at a mass feed rate of, for example, from about 25% to about 75% of the mass feed rate of product (H) is fed to mixing zone 60 to produce an electrocoat binder. The mixing zone equipment may be selected from single or twin screw extruders, static mixers, rotating drum mixers, kneaders, pipes with static mixing elements, mixing augers, and so on. The volume of mixing zone 60 is controlled so that an average residence time is not more than about 20 minutes. The temperature is controlled (e.g., with jackets or internal coils), if necessary, to prevent any premature crosslinking during the residence time in mixing zone 60. In various embodiments, volume of mixing zone 60 is controlled so that an average residence time is not more than about 10 minutes or not more than about 5 minutes in mixing zone 60. Suitable examples of crosslinking agents, include, without limitation, blocked polyisocyanates. Examples of aromatic, aliphatic or cycloaliphatic polyisocyanates include diphenylmethane-4,4'-diisocyanate (MDI), 2,4- or 2,6-toluene diisocyanate (TDI), p-phenylene diisocyanate, tetramethylene diisocyanate, hexamethylene diisocyanate, dicyclohexylmethane-4,4'-diisocyanate, isophorone diisocyanate, mixtures of phenylmethane-4,4'-diisocyanate, polymethylene polyphenylisocyanate, 2-isocyanatopropylcyclohexyl isocyanate, dicyclohexylmethane 2,4'-diisocyanate, 1,3-bis(iso-cyanatomethyl)cyclohexane, diisocyanates derived from dimer fatty acids, as sold under the commercial designation DDI 1410 by Henkel, 1,8-diisocyanato-4-isocyanatomethyloctane, 1,7-diisocyanato-4-isocyanato-methylheptane or 1-isocyanato-2-(3-isocyanatopropyl)-cyclohexane, and higher polyisocyanates such as triphenylmethane-4, 4',4"-triisocyanate, or mixtures of these polyisocyanates. Suitable polyisocyantes also include polyisocyanates derived from these that containing isocyanurate, biuret, allophanate, iminooxadiazinedione, urethane, urea, or uretdione groups. Polyisocyanates containing urethane groups, for example, are obtained by reacting some of the isocyanate groups with polyols, such as trimethylolpropane, neopentyl glycol, and glycerol, for example. The isocyanate groups are reacted with a blocking agent. Examples of suitable blocking agents include phenol, cresol, xylenol, epsilon-caprolactam, delta-valerolactam, gamma-butyrolactam, diethyl malonate, dimethyl malonate, ethyl acetoacetate, methyl acetoacetate, alcohols such as methanol, ethanol, isopropanol, propanol, isobutanol, tert-butanol, butanol, glycol monoethers such as ethylene or propylene glycol monoethers, acid amides (e.g. acetoanilide), imides (e.g. succinimide), amines (e.g. diphenylamine), imidazole, urea, ethylene urea, 2-oxazolidone, ethylene imine, oximes (e.g. methylethyl ketoxime), and the like. Catalyst for curing reaction of a coating film may be incorporated at this or a later point.

Product (K) (electrocoat binder) is continuously withdrawn from mixing zone 60 and can be stored or used in a separate process, or it can be dispersed in an aqueous medium in a continuing step of the continuous process, as shown in FIG. 1. In one embodiment, all volatile material (solvent, etc.) is removed in evaporation zone 40 from Product (G), no solvent is added in making product (K), and Product (K) is a nonvolatile product and is withdrawn at this point. Withdrawn Product (K) is cooled, e.g., on a cooling band, then broken into pieces or granulated once solidified. The pieces or granulated electrocoat binder may then be dispersed by optionally (but preferably) grinding to fine particle size first, then adding the electrocoat binder to a blending tank loaded with water, acid for salting the amine functional epoxy resin, and optionally cosolvent, plasticizer, and other desired additives. Further details for preparing solid electrocoat binder for dispersing and for dispersing solid electrocoat binder are disclosed in Tazzia, U.S. Patent Application Publication No. US 2007/0270526 A1, incorporated herein by reference.

Optionally, plasticizer or solvents or both can be added along with the crosslinker, provided Product (K) is not withdrawn immediately after mixing zone 60, or can be added in an additional mixing zone (not shown). The amine groups of the epoxy resin are salted with an acid such as phosphoric acid, propionic acid, acetic acid, lactic acid, citric acid, nitric acid, or sulfamic acid in the dispersing process. The salting acid may be mixed with the dispersing water in metering tank 62 from where it is fed into dispersing zone 70. The acid is used in an amount sufficient to neutralize enough of the amine groups of the principal resin to impart water-dispersibility to the resin. The resin may be fully neutralized; however, partial neutralization is usually sufficient to impart the required water-dispersibility. By "partial neutralization" we mean that at least one, but less than all, of the saltable groups on the resin are neutralized. By saying that the resin is at least partially neutralized, we mean that at least one of the saltable groups on the resin is neutralized, and up to all of such groups may be neutralized. The degree of neutralization that is required to afford the requisite water-dispersibility for a particular resin will depend upon its chemical composition, molecular weight, and other such factors and can readily be determined by one of ordinary skill in the art through straightforward experimentation.

Continuing with FIG. 1, a mixture of deionized water and salting acid in metering tank 62 is fed, along with Product (K), into dispersion zone 70 to produce an electrocoat emulsion. The amount of electrocoat binder in the dispersion produced in dispersing zone 70 may be from about 10% to about 70% by weight of the emulsion formed in dispersing zone 70. A small amount of higher boiling, cosolvents that contribute to coalescence and stability, such as glycol ethers and glycol ether esters and/or plasticizer may also be included in metering tank 62. Nonlimiting examples of coalescing solvents include alcohols, glycol ethers, polyols, and ketones. Specific coalescing solvents include monobutyl and monohexyl ethers of ethylene glycol, phenyl ether of propylene glycol, monoalkyl ethers of ethylene glycol such as the monomethyl, monoethyl, monopropyl, and monobutyl ethers of ethylene glycol or propylene glycol; dialkyl ethers of ethylene glycol or propylene glycol such as ethylene glycol dimethyl ether and propylene glycol dimethyl ether; butyl carbitol; diacetone alcohol. Nonlimiting examples of plasticizers include ethylene or propylene oxide adducts of nonyl phenols, bisphenol A, cresol, or other such materials, or polyglycols based on ethylene oxide and/or propylene oxide. The amount of coalescing solvent is not critical and is generally between about 0 to 15 percent by weight, preferably about 0.5 to 5 percent by weight based on total weight of the resin solids. Plasticizers can be used at levels of up to 15 percent by weight resin solids.

The electrocoat emulsion (K) is then used in preparing an electrocoat coating composition (or bath). The electrocoat bath usually includes one or more pigments, separated added as part of a pigment paste, and any further desired materials such as coalescing aids, antifoaming aids, and other additives that may be added before or after emulsifying the resin. Conventional pigments for electrocoat primers include titanium dioxide, ferric oxide, carbon black, aluminum silicate, precipitated barium sulfate, aluminum phosphomolybdate, strontium chromate, basic lead silicate or lead chromate. The pigments may be dispersed using a grind resin or a pigment dispersant. The pigment-to-resin weight ratio in the electrocoat bath can be important and should be preferably less than 50:100, more preferably less than 40:100, and usually about 10 to 30:100. Higher pigment-to-resin solids weight ratios have been found to adversely affect coalescence and flow. Usually, the pigment is 10-40 percent by weight of the nonvolatile material in the bath. Preferably, the pigment is 15 to 30 percent by weight of the nonvolatile material in the bath. Any of the pigments and fillers generally used in electrocoat primers may be included. Extenders such as clay and anti-corrosion pigments are commonly included.

The electrodeposition coating compositions can contain optional ingredients such as dyes, flow control agents, plasticizers, catalysts, wetting agents, surfactants, UV absorbers, HALS compounds, antioxidants, defoamers and so forth. Examples of surfactants and wetting agents include alkyl imidazolines such as those available from Ciba-Geigy Industrial Chemicals as AMINE C® acetylenic alcohols such as those available from Air Products and Chemicals under the tradename SURFYNOL®.

Curing catalysts such as tin catalysts can be used in the coating composition. Typical examples are without limitation, tin and bismuth compounds including dibutyltin dilaurate, dibutyltin oxide, and bismuth octoate. When used, catalysts are typically present in amounts of about 0.05 to 2 percent by weight tin based on weight of total resin solids.

Any of these additional materials may be added at suitable times during the continuous manufacturing process or after.

Figure 2:
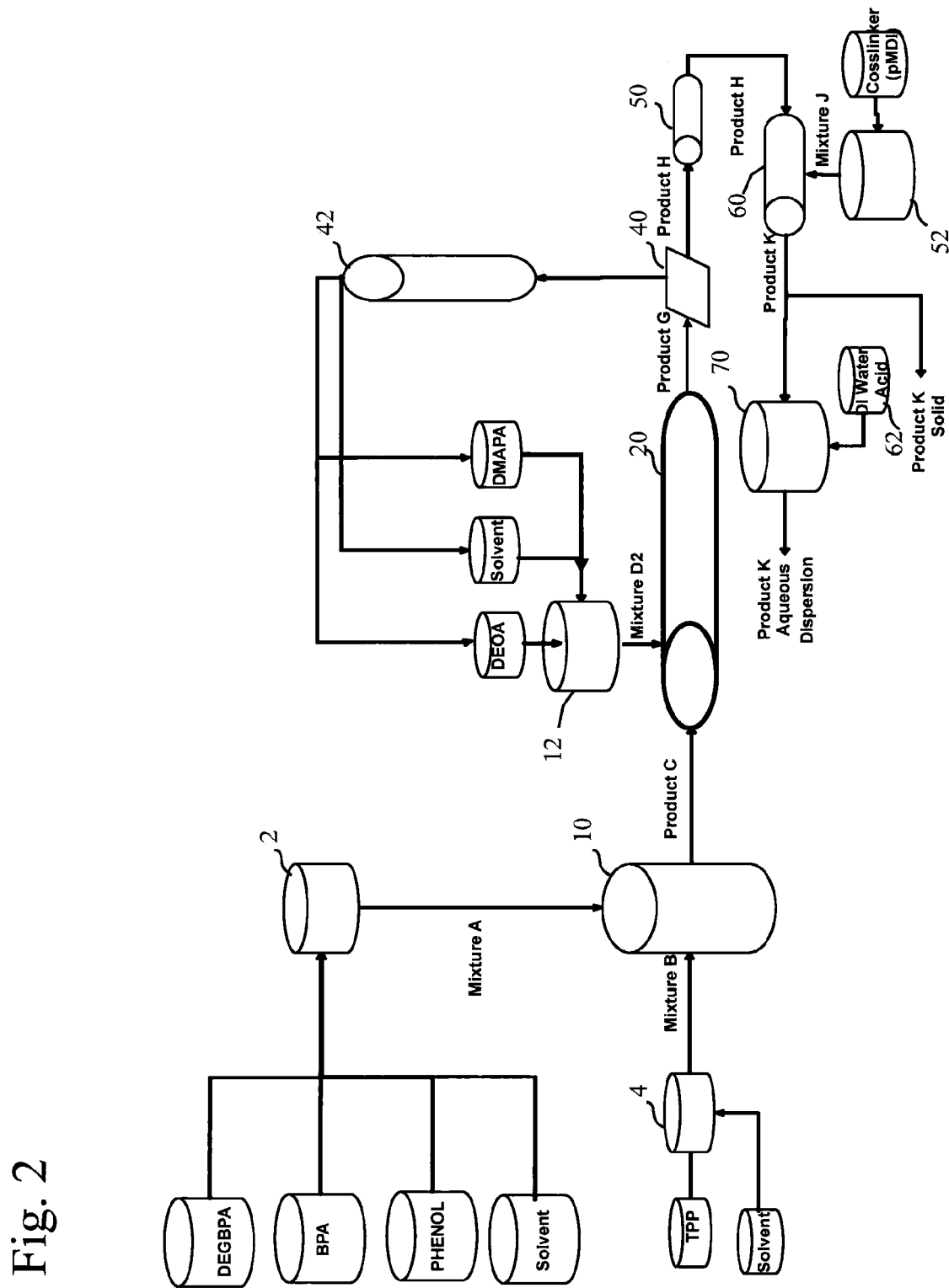
FIG. 2 is a block diagram showing an example of an apparatus with two reaction zones for continuous manufacture of epoxy resins having amine functionality.

Referring now to FIG. 2, in another embodiment, epoxy resin with amine functionality is manufactured using an apparatus with two reaction zones. Metering tanks 2,4 again serve as sources for continuously feeding reactants and catalyst for the ring-opening epoxy polymerization reaction. Similarly to FIG. 1, FIG. 2 shows as an example a diglycidyl ether of bisphenol A (DGEBA), bisphenol A (BPA), phenol, and solvent loaded to metering tank 2 and catalyst and solvent loaded to metering tank 4; again, different polyepoxides, extenders, optional monomeric reactants, optional solvents, or catalysts may be used. As was the case for FIG. 1, the reactants could be divided differently between the two metering tanks or loaded into additional metering tanks. As described in connection with FIG. 1, for ease of metering, the catalyst can be diluted with solvent. In certain embodiments, an amine sufficiently basic to catalyze the ring-opening polymerization is included in the reactants. In certain embodiments, it may be desirable to include solvent along with the polyepoxide, extender, or other reactants. In FIG. 2, the contents of metering tanks 2,4 are fed into a first reaction zone 10, which may include the same equipment as reaction zone 10 of FIG. 1. The example weight amounts of liquid mixtures (A) and (B), example temperatures, and example feed rates may be used as described above with reference to FIG. 1.

Again, a reaction product (C) of the first reaction zone, an epoxide-functional resin, is continuously removed from the first reaction zone 10 at the same mass rate as the combined mass feed rate of mixtures (A) and (B) into first reaction zone 10. Reaction product (C) is continuously fed at the same mass rate at which is removed from reaction zone 10 to a second reaction zone 20. Epoxy equivalent weight of reaction product (C) and reaction zone 20 temperatures may, for example, be those mentioned above in connection with FIG. 1. In FIG. 2, however, unlike FIG. 1, all of the amine reactant (again, represented by diethanolamine, DEOA, and dimethylaminopropylamine, DMAPA) are loaded to metering tank 12, optionally along with solvent. The amine or mixture of amines in metering tank 12 may held at from about 50° C. to about 125° C. As an example, the contents of metering tank 12 may be from about 50 to about 100% of an amine containing an active hydrogen and from 0 to about 50% of a suitable solvent. The reaction product of Mixture (D2) and Product (C) is an amine functional epoxy resin. Examples of average residence times in reaction zone 20, temperatures, and suitable amines and solvents that may be used as the same as those mentioned in connection with FIG. 1. Metering tank 12 is replenished at intervals to ensure the continuous fee rate of liquid mixture (D).

The reaction product (G) of reaction zone 20 may have a hydroxyl equivalent weight HEW of from about 125 to about 500 g/eq. In various other examples, the reaction product (G) has a hydroxyl equivalent weight HEW of from about 175 to about 325 g/eq, or of from about 225 to about 275 g/eq. Reaction product (G) is continuously removed from the reaction zone 20 at the same mass feed rate as the combined mass feed rated of mixture (D2) and product (C). Again, these particular equivalent weights, apply to the specific reactants shown in the example of FIG. 2. From this point, the continuous process continues in the same way as described for FIG. 1.

Figure 3:
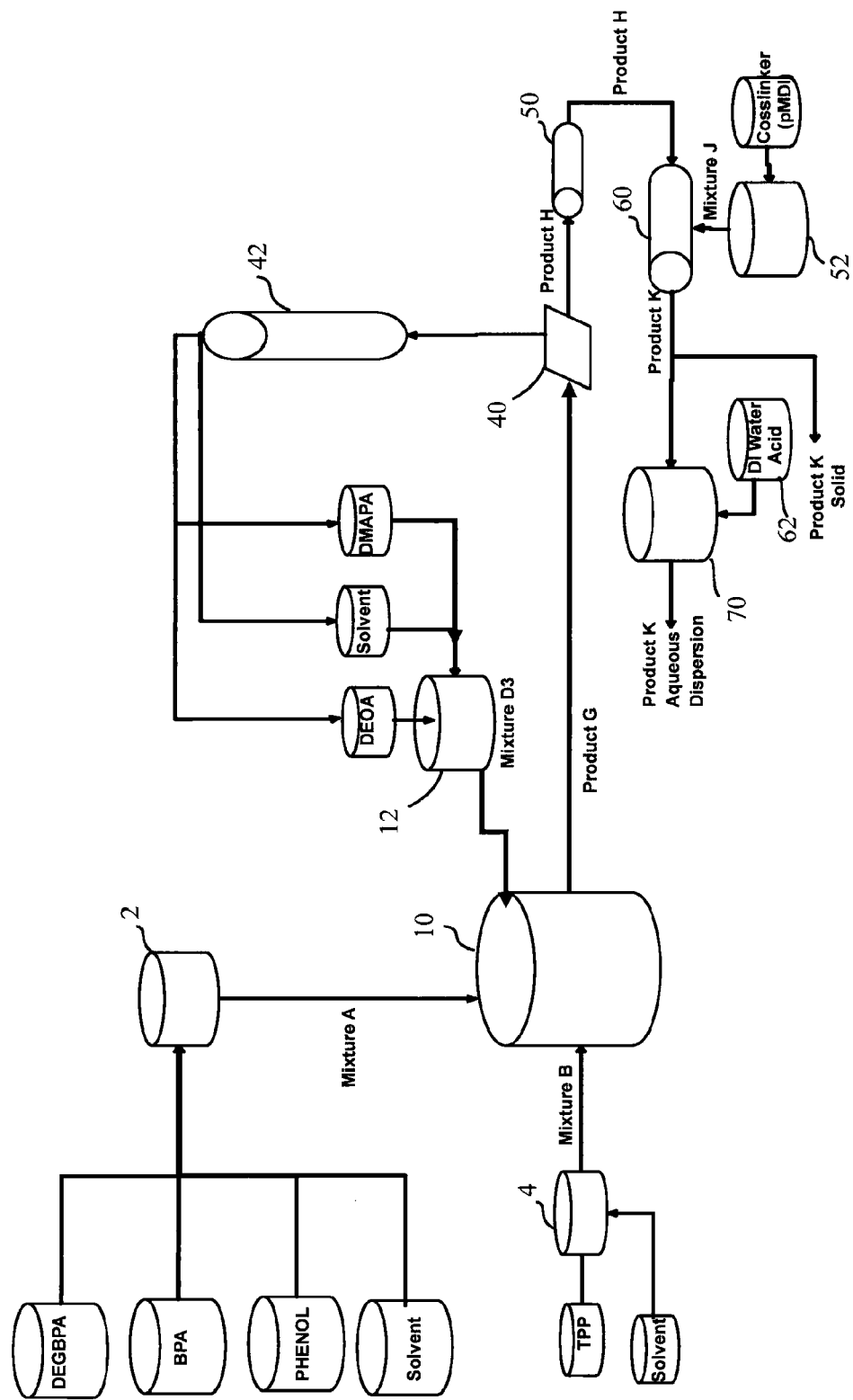
FIG. 3 is a block diagram showing an example of an apparatus with a single reaction zone for continuous manufacture of epoxy resins having amine functionality.

Referring now to FIG. 3, in another embodiment, epoxy resin with amine functionality is manufactured using an apparatus with one reaction zone. This embodiment differs from that of FIG. 2 in that Mixture (D3) of amine with active hydrogen is continuously fed into reaction zone 10 along with Mixture (A) and Mixture (B). Product (G) exiting from reaction zone 10 is an amine-functional epoxy resin. From this point, the continuous process continues in the same way as described for FIG. 1.

The continuous manufacture of the epoxy resin with amine functionality may also be carried out without including a catalyst for the ring-opening polymerization of the polyepoxide by instead increasing the temperature in the first reaction zone 10 to a temperature at which the ring-opening polymerization proceeds without catalyst. For example, this may be accomplished for the reactants shown in FIGS. 1 to 3 when the temperature of the first reaction zone is from about 200 to about 350° C. Thus, in one embodiment, a process for manufacturing an epoxy resin with amine functionality is manufactured according to process already explained with reference to FIG. 1, except that no catalyst is added into the first reaction zone and the temperature in the first reaction zone is from about 200 to about 350° C. Metering tank 4 is omitted from the apparatus for carrying out this embodiment of the process. Similarly, in another embodiment a process for manufacturing an epoxy resin with amine functionality is manufactured according to process already explained with reference to FIG. 2, except that no catalyst is added into the first reaction zone and the temperature in the first reaction zone is from about 200 to about 350° C. Again, metering tank 4 is omitted from the apparatus for carrying out this embodiment of the process. In a third variation, a process for manufacturing an epoxy resin with amine functionality is manufactured according to process already explained with reference to FIG. 3, except that no catalyst is added into the first reaction zone and the temperature in the first reaction zone is from about 200 to about 350° C. Once again, metering tank 4 is omitted from the apparatus for carrying out this embodiment of the process.

Figure 4:
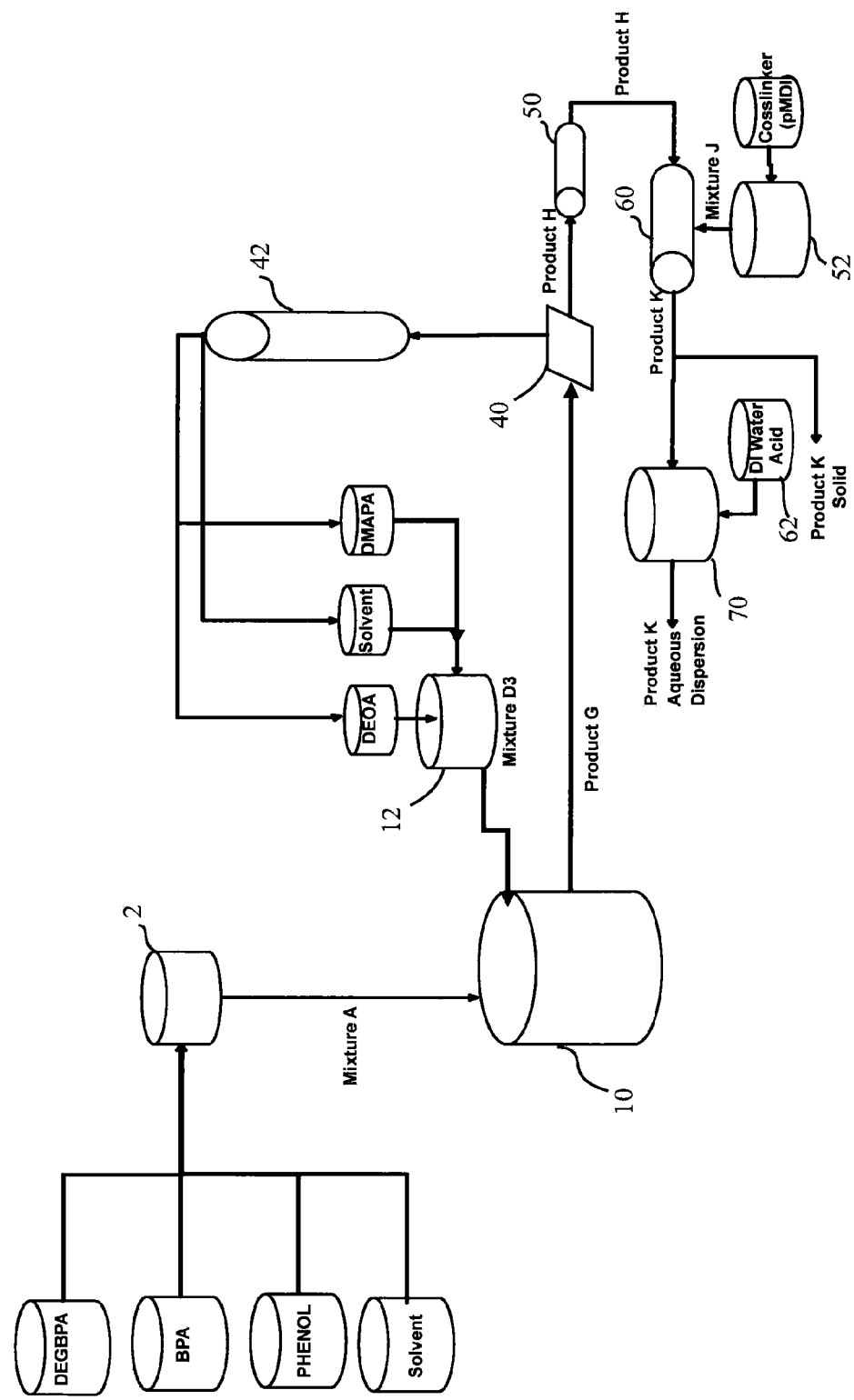
FIG. 4 is a block diagram showing an example of an alternative apparatus with a single reaction zone for continuous manufacture of epoxy resins having amine functionality.

The continuous manufacture of the epoxy resin with amine functionality may also be carried out by including in the first reactor a material that includes a sufficient amount of amine groups of sufficient basicity to catalyze the epoxide ring-opening polymerization, wherein the material has a functional group that reacts with one or more of the reactants in the first reactor. As nonlimiting examples, the material may be selected from amines having both a tertiary amine group and a secondary or primary amine group that reacts with an epoxide group of the epoxy resin. In the example shown in FIG. 4, triphenylphosphine catalyst and metering tank 4 are omitted, with the tertiary amine of DMAPA acting as catalyst for the ring-opening polymerization. The equipment, reaction conditions, reactants and amounts of reactants are otherwise as previously described. The processes described in conjunction with FIGS. 1 and 2 could similarly be altered to omit the triphenylphosphine catalyst and to add a catalytic amount of one of the amine reactants from Mixture (D) and/or Mixture (F) or from Mixture (D2) through metering tank 4 instead, reducing the amount of amine added into the subsequent reaction zone accordingly. In other embodiments, the processes described in conjunction with FIGS. 1 and 2 could similarly be altered to omit the triphenylphosphine catalyst and to add a catalytic amount of one a reactant having a tertiary amine groups and further having one or more epoxide groups or one or more epoxide-reactive groups through metering tank 4 instead.

Figure 5:
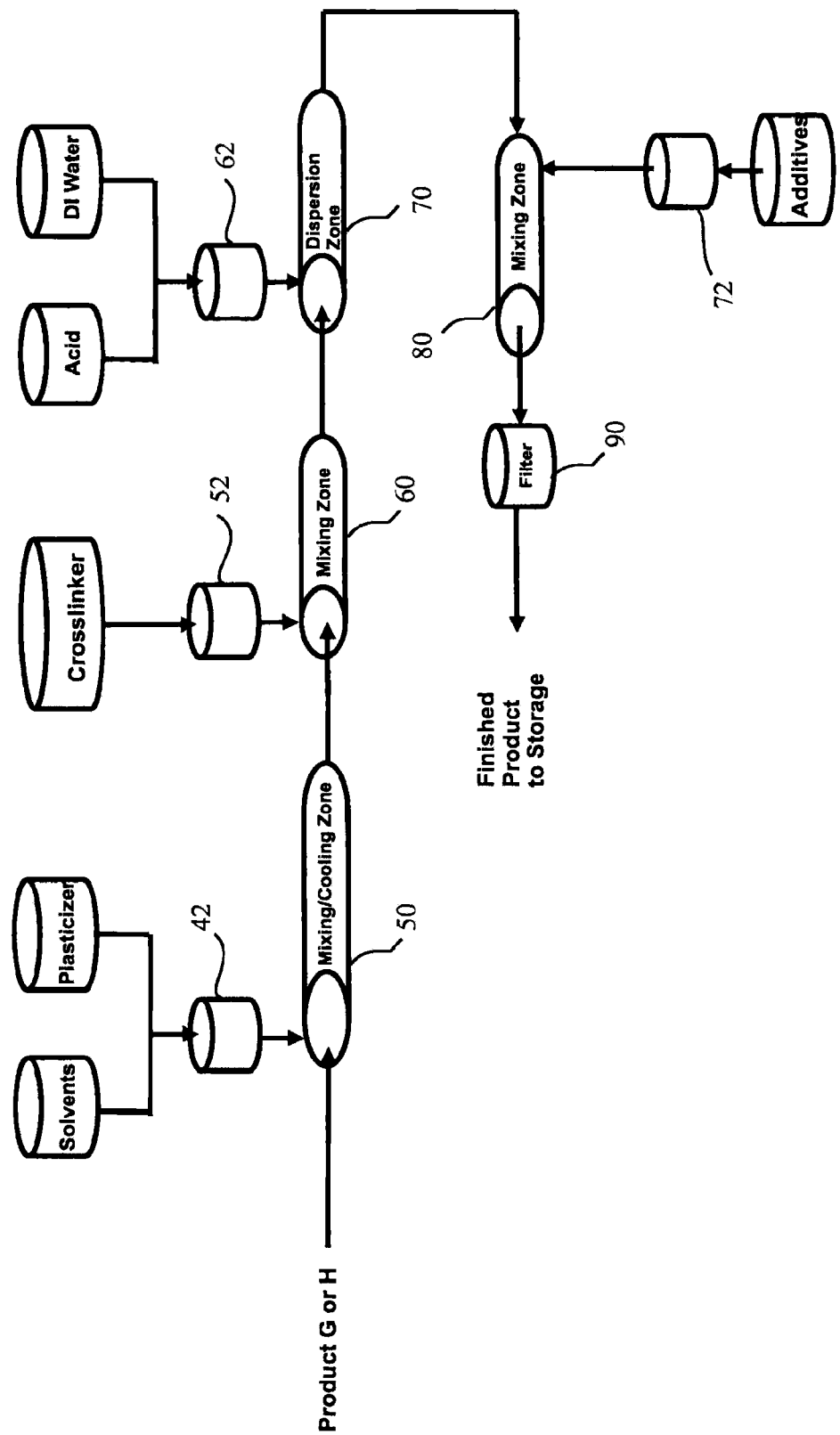
FIG. 5 is a block diagram showing an example of alternative continuous processing of a product epoxy resin having amine functionality after leaving a final reaction zone.
Figure 6:
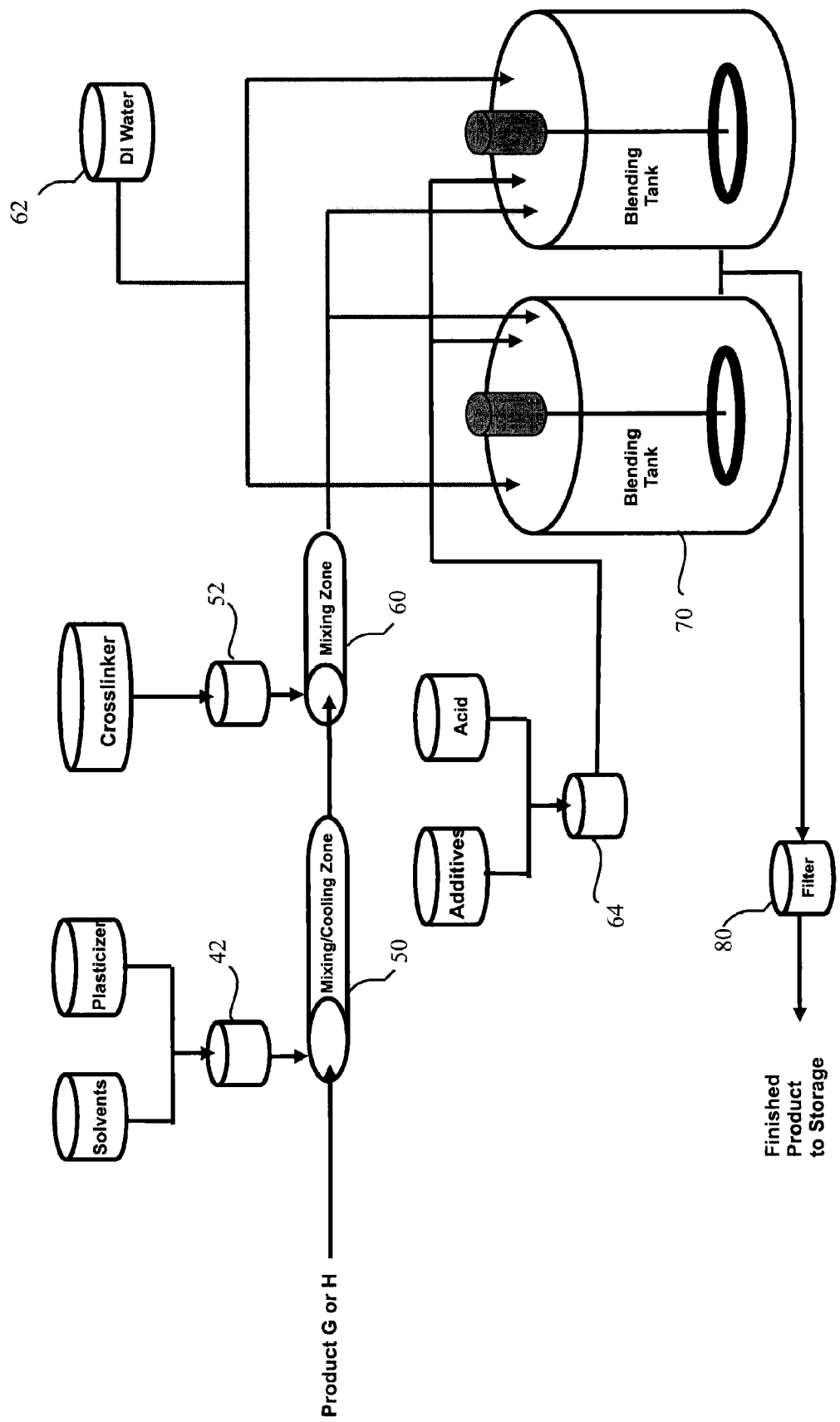
FIG. 6 is a block diagram showing another example of alternative continuous processing of a product epoxy resin having amine functionality after leaving a final reaction zone.

FIGS. 5 and 6 illustrate additional embodiments for processing epoxy resin product (G) after it leaves the last reaction zone or epoxy resin product (H) after it leaves the optional evaporation zone. Referring first to FIG. 5, the epoxy resin product enters a first mixing zone 50 in which it is cooled. A mixture of solvent and plasticizer in metering tank 42 is added at a constant rate into mixing zone 50 to be combined with the epoxy resin product to form an epoxy resin mixture. This mixture then enters mixing zone 60, where crosslinker is introduced from metering tank 52 to produce an electrocoat binder. The electrocoat binder then enters dispersion zone 70, in which a mixture of acid and deionized water are introduced to prepare an aqueous emulsion of the electrocoat binder. Various additive may then optionally be added in mixing zone 80 by way of metering tank 72. The electrocoat emulsion may then be filtered to be ready for use in preparing electrocoat coating compositions.

FIG. 6 illustrates a similar process of preparing an electrocoat binder by first adding solvent and plasticizer from metering tank 42 to the epoxy resin in mixing and cooling zone 50, then adding crosslinker through metering tank 52 in mixing zone 60. Next, however, the electrocoat binder is fed at a constant rate sequentially into a first of a plurality of blending tanks 70, into which are pre-loaded deionized water from metering tank 62 and acid and additive from metering tank 64. When a sufficient amount of electrocoat binder has been added into one blending tank to make an electrocoat emulsion of a desired resin (solids) content, then a feed of the electrocoat binder leaving mixing zone 60 into a second blending tank 70, already pre-loaded with water, acid, and additives, is begun. In the meantime, the finished electrocoat emulsion from the first blending tank 70 is filtered at filter 80 and moved to storage. The first blending tank is then again pre-loaded with deionized water, acid, and additives. There are a sufficient number of blending tanks so that as soon as emulsion is complete in one, another blending tank is pre-loaded and ready for the introduction of the electrocoat binder so that the continuous manufacturing process continues uninterrupted.

The electrocoat emulsion is then used in preparing an electrocoat coating composition or bath as described above.

The electrocoat bath generally has an electroconductivity from 800 micromhos to 6000 micromhos. When conductivity is too low, it is difficult to obtain a film of desired thickness and having desired properties. On the other hand, if the composition is too conductive, problems such as the dissolution of substrate or counter electrode in the bath, uneven film thickness, rupturing of the film, or poor resistance of the film to corrosion or water spotting may result.

The coating composition is electrodeposited onto a substrate and then cured to form a coated article. The electrodeposition coating composition may be applied on any conductive substrate, such as steel, copper, aluminum, or other metals or metal alloys, preferably to a dry film thickness of 10 to 35 μm. The article coated with the composition of the invention may be a metallic automotive part or body. After application, the coated article is removed from the bath and rinsed with deionized water. The coating may be cured under appropriate conditions, for example by baking at from about 275° F. to about 375° F. (about 135° C. to about 190° C.) for between about 15 and about 60 minutes.

Following electrodeposition, the applied coating is usually cured before other coatings, if used, are applied. When the electrocoat layer is used as a primer in automotive applications, one or more additional coating layers, such as a primer-surfacer, color coat, and, optionally, a clearcoat layer, may be applied over the electrocoat layer. The color coat may be a topcoat enamel. In the automotive industry, the color coat is often a basecoat that is overcoated with a clearcoat layer. The primer surfacer and the topcoat enamel or basecoat and clearcoat composite topcoat may be either waterborne or solventborne. The coatings can be formulated and applied in a number of different ways known in the art. For example, the resin used can be an acrylic, a polyurethane, or a polyester. Typical topcoat formulations are described in various patents assigned to BASF Corporation, which offers suitable products commercially.

The description is merely exemplary in nature and, thus, variations that do not depart from the gist of the disclosure are a part of the invention. Variations are not to be regarded as a departure from the spirit and scope of the disclosure.

What is claimed is:

1. A process for continuously manufacturing an amine functional epoxy resin, comprising
   (a) continuously adding reactants comprising polyepoxide and extender to a first reaction zone to prepare an epoxide functional product by ring-opening polymerization of the reactants, wherein the epoxide functional product continuously leaves the first reaction zone and enters a second reaction zone;
   (b) continuously adding at least one amine to the second reaction zone that reacts with the epoxide functional product to produce the amine functional epoxy resin, wherein the amine functional epoxy resin continuously leaves the second reaction zone at a rate equal to a combined rate at which all materials other than the epoxide functional product are added to the first and second reaction zones,
   wherein all of the amine reacted with the epoxide functional product is added in step (b), wherein the average residence time of materials in each reaction zone is not more than about fifteen minutes.

2. A process for continuously manufacturing an amine functional epoxy resin, comprising
   (a) continuously adding reactants comprising polyepoxide and extender to a first reaction zone to prepare an epoxide functional product by ring-opening polymerization of the reactants, wherein the epoxide functional product continuously leaves the first reaction zone and enters a second reaction zone;
   (b) continuously adding at least one amine to the second reaction zone that reacts with the epoxide functional product to produce the amine functional epoxy resin, wherein the amine functional epoxy resin continuously leaves the second reaction zone at a rate equal to a combined rate at which all materials other than the epoxide functional product are added to the first and second reaction zones,
   wherein all of the amine reacted with the epoxide functional product is added in step (b), wherein the first reaction zone is operated at a temperature of from about 200° C. to about 350° C. and no ring-opening catalyst is introduced to the first reaction zone.

3. A process for continuously manufacturing an amine functional epoxy resin, comprising
(a) continuously adding reactants comprising polyepoxide and extender to a first reaction zone to prepare an epoxide functional product by ring-opening polymerization of the reactants, wherein the epoxide functional product continuously leaves the first reaction zone and enters a second reaction zone;
(b) continuously adding at least one amine to the second reaction zone that reacts with the epoxide functional product to produce the amine functional epoxy resin, wherein the amine functional epoxy resin continuously leaves the second reaction zone at a rate equal to a combined rate at which all materials other than the epoxide functional product are added to the first and second reaction zones,
wherein all of the amine reacted with the epoxide functional product is added in step (b), wherein an amine reactant having a sufficient amount of amine groups of sufficient basicity to catalyze the ring-opening polymerization is continuously added to the first reaction zone.

4. A process according to claim 3, wherein the amine reactant comprises a tertiary amine group and an amine group having an active hydrogen.

* * * * *